US006221259B1

(12) United States Patent
Kittrell

(10) Patent No.: US 6,221,259 B1
(45) Date of Patent: Apr. 24, 2001

(54) PROCESS AND CATALYST FOR PHOTOCATALYTIC CONVERSION OF CONTAMINANTS

(75) Inventor: James R. Kittrell, Amherst, MA (US)

(73) Assignee: KSE Inc., Sunderland, MA (US)

( * ) Notice: Subject to any disclaimer, the term of this patent is extended or adjusted under 35 U.S.C. 154(b) by 0 days.

(21) Appl. No.: 09/262,895

(22) Filed: Mar. 8, 1999

(51) Int. Cl.$^7$ ..................................................... C02F 1/32
(52) U.S. Cl. ........................ 210/748; 210/762; 210/763; 210/908; 210/909; 423/247; 423/245.3
(58) Field of Search ................................... 210/748, 759, 210/760, 762, 763, 908, 909; 423/247, 245.1, 245.3

(56) References Cited

U.S. PATENT DOCUMENTS

| | | | |
|---|---|---|---|
| 4,751,005 | * 6/1988 | Mitsui et al. | 210/759 |
| 4,780,287 | 10/1988 | Zeff et al. | 422/186.3 |
| 4,861,484 | * 8/1989 | Lichtin et al. | 210/638 |
| 4,863,608 | * 9/1989 | Kawai et al. | 210/638 |
| 4,888,101 | 12/1989 | Copper | 204/157.15 |
| 4,966,665 | 10/1990 | Ibusuki et al. | 204/157.3 |
| 5,045,288 | 9/1991 | Raupp et al. | 422/186.3 |
| 5,468,699 | 11/1995 | Zhang et al. | 502/60 |
| 5,501,801 | * 3/1996 | Zhang et al. | 210/748 |
| 5,580,461 | * 12/1996 | Cairns et al. | 210/673 |
| 5,779,912 | * 7/1998 | Gonzalez-Martin et al. | 210/748 |

OTHER PUBLICATIONS

Raupp. G. B., et al. "Destruction of Organics in Gaseous Streams Over UV–Excited Titania" 85th Annual Meeting, Air & Waste Management Assoc., Kansas City, Jun. 21–26, 1992.

Raupp, G. B., "Photocatalytic Oxidation for Point–of–Use VOC Abatement in the Microelectronics Fabrication Industry", 87th Annual Meeting, Air & Waste Management Assoc., Cincinnati, Ohio, Jun. 19–24, 1995.

Ollis, D. F., in Photocatalytic Purification and Treatment of Water and Air, 481–494, Elsevier, NY (1993).

Peral, J. and D.F. Ollis Heterogeneous Photocatalytic Oxidation of Gas–Phase Organics for Air Purification, J. Catalysis, 136, 554–564 (1992).

Wang, K. and B.J. Marinas, in Photocatalytic Purification, and Treat, of Water and Air, 733–737, Elsevier (1993).

Al–Ekabi, H., et al. in Photocatalytic Purification & Treatment of Water and Air, 719–725, Elsevier, NY (1993).

Formenit, M., et al., "Heterogeneous Photocatalysis for Oxidation of Paraffins", Chemical Technology 1, 680–686, 1971.

Yamazaki–Nishida, S., et al., "Gas Phase Photocatalytic Degradation on Titania Pellets of Volatile Chlorinated Organic Compounds from a Soil Vapor Extraction Well", J. Soil Contamination, Sep., 1994.

Fu, X., W.A. Zeltner, and M.A. Anderson, "The Gas–Phase Photocatalytic Mineralization of Benezene on Porous Titania–Based Catalysts", Applied Catalysis B; Environmental, 6, 209–224 (1995).

Plank, J. In Emmett, P.H. Ed Catalysis vol. I Fundamental Principles (Part 1), 315–352, Reinhold Publishing Corp., New York, 1954.

Brinker, C.J. and G.W. Schere, "Sol–Gel Science, The Physics and Chemistry of Sol–Gel Processing" Academic Press, New York, (1990).

* cited by examiner

Primary Examiner—Peter A. Hruskoci
(74) Attorney, Agent, or Firm—Bachman & LaPointe, P.C.

(57) ABSTRACT

A process and catalyst for the conversion of contaminants in an oxygen containing contaminated stream comprises passing the oxygen containing contaminated stream over a photocatalyst comprising titanium, zirconium and silica while irradiating the foregoing catalyst with ultraviolet light.

25 Claims, No Drawings

PROCESS AND CATALYST FOR PHOTOCATALYTIC CONVERSION OF CONTAMINANTS

BACKGROUND OF THE INVENTION

The present invention is drawn to a process and catalyst for the conversion of contaminants in oxygen containing contaminated fluids into less harmful products by irradiating the contaminated fluid with ultraviolet light while the contaminated fluid is in contact with the catalyst.

In spite of decades of effort, a significant need remains for an advanced technology to control stationary source emissions of volatile organic compounds (VOCs) as for example benzene, chlorinated volatile organic compounds (CVOCs) as for example trichloroethlyene, and toxic air pollutants (TAPs) as for example acrylonitrile. A particular need exists for technology which controls emissions from industrial processes and other applications where low concentrations of VOCs and TAPs are present in high flow rate air streams. Similarly, a particular need remains for a technology which can purify aqueous streams containing low concentrations of VOCs.

Dilute stream pollution control is becoming recognized as a major environmental control issue for the United States industrial community at large. For example, the control of air pollution associated with solvent degreasing operations is necessary, including the dilute emissions associated with exhaust ventilation fans. Also, air stripping of contaminated groundwater produces dilute air emissions for which current technology provides no satisfactory solution. Catalytic combustors are available, but require processing tremendous volumes of air and result in uneconomic performance. Thermal incinerators require excessive supplemental fuel for dilute mixtures, and exhibit uncertain selectivity when CVOCs are involved. Gas membrane processes are only now emerging for gas separation, and are ill-suited for dilute mixtures. Pressure swing adsorption using zeolites or resins is not applicable to dilute mixtures, and rotating wheel adsorbers are uneconomic for such dilute concentrations of organics. Packed bed activated carbon adsorption is widely practiced, but creates a hazardous solid waste which is increasingly difficult to manage. Carbon regeneration by steam is costly, and is generally economic only for very large scale operations. Landfill options for spent carbon will become more limited, as it involves transportation and disposal of hazardous wastes, particularly for CVOC applications. Similar deficiencies are exhibited in aqueous phase treatment systems.

Control of indoor air pollution is also of growing importance, with the objective of enhancing workplace environmental health and safety protection. The Occupational Safety and Health Administration (OSHA) is promulgating new regulations to reduce workplace exposure to indoor air contaminants such as CVOCs. Many CVOCs are particularly toxic. Certain CVOCs are suspected carcinogens, others are linked to possible birth defects, and still others are suspected active precursors in the destruction of the stratospheric ozone layer. Of the 189 targeted air toxics in the Clean Air Act Amendments of 1990, about one-third of the compounds are chlorinated. By the standards of conventional air pollution control technology, indoor air pollution is at exceedingly dilute concentrations.

The industrial demand for ultrapure water is also growing rapidly, requiring development of a technology which effectively removes organic contaminates at very low concentrations. For example, integrated circuits require highly purified water for rinsing semiconductor wafers, controlled to a total organic carbon level of 50 ppb. Reduction of the organic content of water to these levels is not readily achievable with existing technology.

In spite of considerable efforts of researchers in the field, most UV photocatalysts exhibit shortcomings in catalyst activity, selectivity, and deactivation which limit their commercial utility for air and water pollution control.

Researchers have studied titania photocatalysts which have been used for decades (See Formenti, M., et al., "Heterogeneous Photocatalysis for Oxidation of Paraffins", Chemical Technology 1, 680–686, 1971, and U.S. Pat. No. 3,781,194 issued Dec. 25, 1973). Raupp et al have reported titania photocatalysts for the UV oxidation of organics in air. The activity of a titania photocatalyst rapidly declines with time-on-stream with trichloroethylene (TCE) in air (See Raupp, G. B., et al., "Destruction of Organics in Gaseous Streams Over UV-Excited Titania", 85th Annual Meeting, Air & Waste Management Association, Kansas City, Jun. 21–26, 1992; and Raupp, G. B., "Photocatalytic Oxidation for Point-of-Use VOC Abatement in the microelectronics Fabrication Industry", Air & Waste Management Association, 87th Annual Meeting, Cincinnati, Ohio, Jun. 19–24, 1995). Ollis et al. Describes photocatalytic reactors and reports that TCE photocatalysis in air can lead to 75 ppm(v) of phosgene in the reactor product in the photocatalytic oxidation of organics over a thin titania bed (See Ollis, D. F., in Photocatalytic Purification and Treatment of Water and Air, 481–494, Elsevier N.Y., 1993; and Peral, J. and D. F. Ollis, "Heterogeneous Photocatalytic Oxidation of Gas-Phase Organics for Air Purification", J. Catalysis, 136, 554–564, 1992). Researchers at Purdue have investigated gas phase photocatalysis of TCE using titania on a concentric reactor wall around a UV light source. They employed residence times of over 6 seconds, and found evidence of byproducts, suspected to be phosgene (See Wang, K. and B. J. Marinas, in Photocatalytic Purification and Treat. of Water and Air, 733–737, Elsevier, 1993). Teichner et al. report that byproduct formation with titania photocatalysts is the rule, not the exception (See Teichner, S. J. and N. Formenti, in Photoelectrochemistry, Photocatalysis and Photoreactors, 457–489, Reidel Pub, Boston, 1985). Nutech Energy Systems has disclosed titania impregnated on a fiberglass mesh (See U.S. Pat. No. 4,892,712 issued Jan. 9, 1990; U.S. Pat. No. 4,966,759 issued Oct. 30, 1990; and U.S. Pat. No. 5,032,241 issued Jul. 16, 1991). A technical paper on the Nutech technology disclosed a gas phase residence time of 8.4 seconds and evidence of byproducts formation up to 34 seconds residence time (See Al-Ekabi, H., et al., in Photocatalytic Purification & Treatment of Water and Air, 719–725, Elsevier, N.Y., 1993). The University of Wisconsin investigators have used 100 second residence time for photocatalytic destruction of gas phase TCE using titania (See Yamazaki-Nishida, S., et al., "Gas Phase Photocatalytic Degradation on Titania Pellets of Volatile Chlorinated Organic Compounds from a Soil Vapor Extraction Well", J.Soil Contamination, September, 1994; Fu, X., W. A. Zeltner, and M. A. Anderson, "The Gas-Phase Photocatalytic Mineralization of Benzene on Porous Titania-Based Catalysts", Applied Catalysis B: Environmental, 6, 209–224, 1995; U.S. Pat. No. 5,035,078 issued Jul. 30, 1991).

Due to the high absorption of UV light by titania about 99% of the incident UV radiation is absorbed within the first 4.5 microns on titania (See Peral, J. and D. F. Ollis, "Heterogeneous Photocatalytic Oxidation of Gas-Phase Organics for Air Purification", J. Catalysis, 136, 554–564, 1992). Hence, the patent literature discloses process to distribute the titania in thin layers in an attempt to overcome this deficiency. In 1973, Teichner disclosed a process of using titania supported on a matrix in a thin film reactor to oxidize hydrocarbons to aldehydes and ketones (See U.S. Pat. No. 3,781,194 issued Dec. 25, 1973). Titania has been deposited in thin layers on glass wool (See U.S. Pat. No. 4,888,101 issued Dec. 19, 1989), on a ceramic membrane (See U.S. Pat. No. 5,035,078 issued Jul. 30, 1991), and the wall of a reactor (See U.S. Pat. No. 4,966,665 issued Oct. 30, 1990). Raupp et al. Has disclosed titania for photocatalytic use when mixing two gas streams, and included thin bed catalytic reactors (See U.S. Pat. No. 5,045,288 issued Sep. 3, 1991).

U.S. Pat. No. 4,966,665 discloses the use of titanium dioxide as a photocatalyst for destruction of chlorine-containing organic compounds in an oxygen-bearing vent gas. The process was used in a system wherein the titanium dioxide was supported on the wall of a reactor through which the vent gas is passed. This is an ineffective reactor design for large gas flows, because each UV bulb must be located in its own concentric tube coated with catalyst, requiring a very large number of small diameter parallel tubes among which the flow must be equally balanced. Further, the cost of such a reactor is very high compared to a single large diameter reactor. Still further, when a vent gas containing 30 ppm TCE was contacted with titanium dioxide for 26 seconds, 90% destruction of TCE was obtained. However, the analysis of the reactor products revealed the formation of byproducts such as 4 ppm phosgene and 1 ppm carbon tetrachloride which are more hazardous than TCE.

U.S. Pat. No. 5,045,288 discloses a process of removing organic contaminants from a gaseous stream, wherein a mixing step is conducted, combining (a) a gaseous oxygen bearing stream and (b) a contaminated stream. This mixture is then passed over a photocatalyst exposed to UV radiation of wavelength not greater than 600 nm. The reaction conditions must be preselected to prevent formation of a liquid phase on the catalyst. Only when the reactor comprises a body portion having a window for passing visible light, the photocatalyst may be selected from the group consisting of titanium dioxide, zirconium oxide, antimony oxide, zinc oxide, stannic oxide, cerium oxide, tungsten oxide, and ferric oxide. The invention is deficient in that it requires mixing two streams, requires avoiding liquid phases, and requires a visible light window, all of which are impractical in commercial systems. Further, the catalyst compositions are not effective.

U.S. Pat. No. 4,888,101 discloses a system for photocatalysis wherein a semiconductor is entrapped in a fiber mesh. U.S. Pat. Nos. 4,892,712 and 4,966,759 disclose a photocatalyst for detoxifying organic pollutants from a fluid, comprising a substrate in the form of a plurality of layers of a filamentous, fibrous, or stranded base material, and a photoreactive metal semiconductor material bonded to surfaces of said layers. The photoreactive material is selected from anatase, CdS, CdSe, $ZnO_2$, $WO_3$, and $SnO_2$. These disclosures are of limited value because the substrate leads to a high pressure drop under conditions providing intimate contacting of the fluid flowing through or by the substrate. Further, the base material is generally of low surface area, leading to poor overall reactor performance. Still further, the design also generally requires a sleeve of this material around each bulb, leading to a costly reactor design. Finally, the photoreactive metal semiconductors are not of high photocatalytic activity. U.S. Pat. No. 5,032,241 provides a similar system for killing microorganisms in a fluid.

U.S. Pat. No. 4,780,287 discloses a process of decomposing volatile organic halogenated compounds by passing the gas through silica gel or quartz chips, and the bed is thereafter irradiated with UV light. Ozone or hydrogen peroxide are added to an aqueous phase. The system lost catalytic activity and required heating with nitrogen gas to restore the decomposing activity. Presumably, this loss of activity was due to the decomposition of the CVOC, rather than promoting its oxidation as disclosed in the present application. U.S. Pat. No. 4,941,957 discloses a process for decomposing CVOCs present in gases and aqueous solutions. The aqueous phase CVOCs are removed by volatilizing into a gaseous carrier. The gas was then passed through silica gel and simultaneously irradiated with UV light and/or exposing the bed to ozone. The system required a great excess of ozone, using 2% ozone to decompose TCE at air compositions of only 50 parts per billion (ppb) to 700 ppb, which is generally uneconomic.

U.S. Pat. No. 5,468,699 discloses a process of forming a semiconductor material such as titanium dioxide incorporating molecular sieve material. A 10 ppm aqueous solution of TCE was mineralized to chloride ions in a flow reactor. An excessively long residence time of 1 hour was required for mineralization.

U.S. Pat. No. 4,863,608 discloses a photocatalyst comprising an inorganic semiconductor selected from $TiO_2$, $SrTiO_3$, and CdS in fine particulate form, and a noble metal or an oxide thereof selected from the group consisting of Pt, Pd, Ru, $RuO_2$ and Rh deposited on said semiconductor particle. A process is disclosed for purifying water using said photocatalyst, particularly the last trace amount of organic carbon impurities. However, this technology requires excessive reaction time for water purification, of up to 60 minutes.

Accordingly, it is a principle object of the present invention to provide a process and an improved photocatalyst for efficient oxidative destruction of contaminants in oxygen containing contaminated fluid streams utilizing ultraviolet light.

It is a further object of the present invention to provide a process and catalyst as mentioned above which is relatively easy and inexpensive to implement and carry out.

SUMMARY OF THE INVENTION

The foregoing objects are achieved by way of the present invention wherein a process comprises passing a fluid, containing a contaminant and oxygen, over a photocatalyst comprising titanium, zirconium and silica while irradiating the photocatalyst with ultraviolet light.

In accordance with the present invention the photocatalyst comprises titanium in an amount of between about 0.001 wt. % to about 2.0 wt. % and zirconium in an amount of between 0.001 wt. % to about 2.0 wt. %, both supported by silica. The preferred photocatalyst comprises titanium in an amount of between about 0.005 wt. % to about 0.500 wt. % and zirconium in an amount of between about 0.005 wt. % to about 0.500 wt. %. Ideally titanium and zirconium are present in an amount between about 0.008 wt. % to about 0.080 wt. %. The wavelength of the ultraviolet light irradiating the photocatalyst is less than or equal to about 400 nm and, preferably, between about 185 nm to 375 nm. and the process of the present invention is carried out at temperatures of from about 0° F. to about 1000° F., preferably from about 50° F. to about 200° F., and more preferably from about 70° F. to about 150° F. The process is carried out at pressures of from about 0.1 atm to about 10 atm and preferably between about 0.8 atm to 1.5 atm. The contact time for the contaminated fluid stream with the photocatalyst of the present invention is between about 0.01 seconds to about 10 minutes. The contact time for gas phase systems is between 0.05 seconds to 1 minute, preferably between 0.1 to 5.0 seconds; and 0.5 seconds to 5 minutes for aqueous systems, where contact time is defined as the ratio of the volume of the photocatalyst to the total volumetric flow rate of the contaminated fluid stream passing through the reactor at the temperature and pressure of the fluid entering the reactor.

In accordance with the process of the present invention, the oxygen containing fluid, which also contains the contaminate, is selected from the list consisting of gaseous mixtures and water, with oxygen concentration sufficient to permit complete oxidation of the contained contaminants. The minimum oxygen content of the fluid stream must be sufficient to substantially oxidize any organic contaminant in the stream, and may be calculated as a function of the concentration of the contaminant. In accordance with a preferred embodiment of the present invention the amount of oxygen in the oxygen containing fluid stream is present in an amount, with respect to the contaminants, of at least two times stoichiometric. The fluid may be contacted by any process known in the art and, preferably, by passing the fluid over a packed bed of the photocatalyst which is illuminated with the ultraviolet light. The ultraviolet light can be caused to illuminate the photocatalyst in any fashion known in the art, and preferably, by embedding light bulbs in the packed bed of photocatalyst or by illuminating beds of the photocatalyst by alternate rows of UV lamps to illuminate the photocatalyst from top and bottom.

Further objects and advantages of the present invention will appear from the detailed description.

DETAILED DESCRIPTION

The present invention provides a simple and inexpensive approach for destruction of a wide variety of hazardous VOCs and TAPs in fluids, particularly at dilute concentrations. Contaminants, such as VOCs, entering the reactor are believed concentrated on the surface of the photocatalyst contained in a reactor. It is believed, under illumination by UV light, these adsorbed contaminants are continuously destroyed on the surface by the photocatalytic action of the photocatalyst, and a substantially contaminant-free fluid leaves the reactor system.

Concentration of the contaminant on the photocatalyst surface through adsorption enhances the technology effectiveness particularly for dilute VOC mixtures in fluids. Adsorption increases the residence time of the contaminant molecules in the reactor, even at high gas rates of the bulk gas stream through the reactor. By analogy to a carbon adsorber, a contaminant molecule could remain on a carbon bed for months before breakthrough, that is, when the bed is saturated and the contaminant is observed in the exit gas. This contaminant adsorption on the photocatalyst provides a very long effective residence time for the UV-initiated destruction reaction, which greatly enhances reaction selectivity. Of course, without UV illumination of the catalyst, the photocatalyst would simply adsorb contaminants and would show a breakthrough curve analogous to that of carbon.

The invention provides a fluid phase oxidation system, using oxygen contained in the inlet fluid to the process as the oxidant, which operates at a surprisingly lower contact time with higher selectivity than prior art photocatalytic systems. The absence of any added oxidant, such as ozone or hydrogen peroxide, provides a simpler, lower cost process. The contact time, defined as the ratio of the catalyst bulk volume to the volumetric flow rate of the entering fluid, is an important commercial parameter of the invention. A low contact time is equivalent to a low catalyst volume when processing a given flow rate of fluid. If the contact time is reduced by a factor of ten, not only is the required volume of catalyst reduced by a factor of ten, but also the number of UV lamps and ballasts are proportionately reduced and the size of the reactor is proportionately reduced. These latter considerations greatly reduce the cost of construction and operation of the photocatalytic fluid purification process of the present invention, compared to the prior art. As will be exemplified below, contact times of $\leq 0.5$ seconds can be utilized with the present invention, compared to contact times as high as 34 to 100 seconds with prior art titania photocatalysts. The present invention thereby enables a surprisingly high 68 to 200-fold size reduction and a proportionate cost reduction compared to that of the prior art. An improvement of this magnitude would not be expected by those skilled in the art.

It is believed that the exceptional results of the photocatalysts of the present invention are due to three attributes: (a) a high adsorption capacity of the adsorbent, which provides a long contaminant exposure time to UV light at short overall gas residence times, (b) the high transparency of the catalyst to UV light, and (c) the high photocatalytic activity of the photocatalyst composition employed. These extremely short residence times enable the photocatalytic technology to emerge as a cost effective environmental control option for large flow rates of fluid with dilute contaminant concentrations. The high transparency of the catalyst is important to be able to build large scale reactors at modest cost. For example, an effective reactor can be constructed by simply pouring the granular catalyst around a bank of UV light bulbs, achieving an extremely low cost system with high performance efficiency.

In accordance with the present invention, the photocatalyst comprises titanium, zirconium and silica with amounts selected to achieve high adsorption capacity, high UV transparency and high activity. The photocatalyst comprises titanium in an amount of between about 0.001 wt. % to about 2.0 wt. %, preferably 0.005 wt. % to 0.500 wt. %, ideally; and zirconium in an amount of between 0.001 wt. % to about 2.0 wt. %, preferably 0.005 wt. % to 0.500 wt. %, ideally supported by, that is, on or distributed throughout, the silica component. The wavelength of the ultraviolet light irradiating the photocatalyst is less than or equal to about 400 nm and, preferably between about 185 nm to 375 nm.

The photocatalyst may further include a metal selected from the group consisting of platinum, palladium and mixtures thereof in an amount of between about 0.01 wt. % to about 2.0 wt. %, and/or a metal selected from the group consisting of silver, gold and mixtures thereof in an amount of between about 0.01 wt. % to about 2.0 wt. %.

The photocatalyst has the following physical properties:

pore volume $\geq 0.4$ cm$^3$/g, preferably 0.3 to 1.5;

surface area $\geq 100$ m$^2$/g, preferably 100 to 400; and a water saturation capacity of $\leq 7$ wt. % at 10% relative humidity air at 70° F. and preferably $\leq 5$ wt. %.

In accordance with the present invention the photocatalyst has relative UV light transmission of at least about 150 microwatts/cm$^2$ as measured in accordance with the Transmittance Test described hereinbelow and preferably 200 to 1000 microwatts/cm$^2$.

Aquagel preparation procedures employed in the present invention are based on the known art of catalyst synthesis (See Plank, J. in Emmett, P. H., Ed., *Catalysis Volume I Fundamental Principles* (Part 1), 315–352, Reinhold Publishing Corporation, New York, 1954). Brinker also summarizes methods to optimize catalyst properties (See Brinker, C. J. and G. W. Scherer, "Sol-Gel Science, The Physics and Chemistry of Sol-Gel Processing", Academic Press, New York, 1990). Kittrell has disclosed aquagel preparation procedures in U.S. Pat. Nos. 3,639,271 and 3,669,873. In preparing a typical aquagel batch, two solutions are first prepared. One solution is comprised of 1000 ml of distilled, deionized water to which 500 ml of The PQ Corporation "N" Brand water glass is added. The "N" Brand water glass has a $SiO_2/Na_2O$ ratio of 3.22. The second solution contains 245 ml of 4.0N hydrochloric acid (HCl) diluted with 300 ml of distilled, deionized water. After both solutions are cooled to 5° C., the water glass solution is added to the acid solution with vigorous agitation. Any of the above oxidation promoters or zeolites may be added at this point, as aqueous or nonaqueous solutions or as finely divided solids. The resulting solution (or suspension) is then poured into a shallow flat tray. The mixture resulting from combining the two solutions has a pH of approximately 6.2 and an initial gel time of about 2 minutes. The gel time can be increased or decreased as desired, by adjustment of the solution concentrations and final pH. Within minutes, the gel is stiff enough to cut into cubes. Cubes of gel are cut about one inch on a side and immediately transferred to a 3 liter Buchner funnel. The cubes are soaked in iN HCl for about two hours with enough acid to just cover the aquagel. The acid soaking is repeated three times. The aquagel cubes are then washed free of sodium ions with distilled, deionized water, and dried in air for about four hours at 1500° C. At this stage of preparation, the aquagel is typically transparent to UV radiation. The aquagel preparation is completed by calcining in air at about 200 to 550° C., depending on the promoters added. For example, titania is believed to be maintained in the anatase phase by restricting the calcination temperature below about 300° C. Other promoters may be calcined at temperatures approaching 500° C. to decompose the metal salts.

The aquagels produced by this preparation method typically have high surface area required for the photocatalyst of the present invention. The surface area and pore size can be controlled over a wide range by altering pH and the cations of the initial mixture or of the soaking solution, as is known to one skilled in the art. Calcination temperature and atmosphere also affect surface area. Decreasing surface area by this approach results in larger pore sizes which may be more accessible for photocatalytic reaction. Incorporation of promoters in the gel formulation also impacts surface area. The transparency of the final aquagel can be altered by changes in the formulation as well as by extended drying.

The photocatalyst can also be prepared by impregnation by incipient wetness methods. In this method, a solution of the salt of the active metal is prepared, either in water or an organic solvent such as ethanol, depending on the solubility of the salt. The catalyst, such as the aquagel described above, is contacted with just enough of this salt solution to absorb the solution into the pores, fully saturating the pores. In this case, the addition of another drop of solution would not absorb in the pores, but rather would drop to the bottom of the beaker. Then, the catalyst can be dried slowly at 70° C. to remove moisture without promoter migration to the exterior of the catalyst particle, then fully dried at 115° C., then calcined at temperatures of 200° C. to 500° C. for several hours.

The catalyst UV transmittance test procedure was developed to obtain a relative measure of the UV light transmission of catalysts. Two high purity, 3 inch diameter quartz disks were used to contain a catalyst sample in a cylindrical chamber with walls that were white but do not transmit UV light. The test chamber was of 1.25 inch diameter and 0.75 inch length, and was completely filled by the catalyst sample. The chamber was positioned on a 365 nm sensor of a UVX Radiometer (UVX, Inc., San Gabriel, Calif.) such that the 0.5 inch diameter sensor face was completely covered by the chamber. The chamber was then irradiated with a Sylvania Blacklight 4 watt bulb (F4T5/BLB). The UV intensity was measured in microwatts per square centimeter, and used to judge the relative UV transmittance of various catalyst samples.

The UV light transmission properties for selected materials are reported in Table 1. The test provides the relative amount of UV radiation at a specific wavelength which passes completely through and out of a catalyst bed of depth of 0.75 inches, including reflection, absorption, and diffraction. The higher the numerical value in Table 1, the better the photocatalyst in large scale applications requiring substantial thickness of photocatalyst beds, all other photocatalytic properties being equal.

In Table 1, the short cylinders of cut quartz transmit UV relatively well. Since the quartz is completely transparent to UV radiation, this entry represents the reflection of radiation off the cylinders. Of course, the quartz cylinders have poor photocatalytic activity, and a very low surface area. The photocatalysts of the present invention have excellent UV transparency, excellent photocatalytic activity, and high surface area, and are exemplified in Table 1.

TABLE 1

| Relative Catalyst UV Light Transmission Test Result | |
|---|---|
| Catalyst Type | Relative Transmission, microwatts/square cm. |
| Empty Chamber Reference Level | 1000 |
| Quartz Tubing Cylinders | 520 |
| Silica Aquagel of Present Invention | 220 |
| Thin Titania Coated Quartz | Nil |
| Titania | Nil |

The process of the present invention comprises passing an oxygen containing fluid stream (gaseous or aqueous) over the photocatalyst while irradiating the photocatalyst with ultraviolet light of wave length less than or equal to about 400 nanometers. The method is carried out at temperatures of from about 0° F. to about 1000° F., preferably from about 50° F. to about 200° F., and more preferably from about 70° F. to about 150° F. The method is carried out at pressures of from about 0.1 atm to about 10 atm and preferably between about 0.8 atm to 1.5 atm. The contact time for the contaminated fluid stream with the photocatalyst of the present invention is between about 0.01 seconds to about 10 minutes. The contact time for gas phase systems is between 0.01 seconds to 1 minute, preferably between 0.1 to 5.0 seconds; and preferably 0.5 seconds to 5 minutes for aqueous systems, where contact time is defined as the ratio of the volume of the photocatalyst to the total volumetric flow rate of the contaminated fluid stream passing through the reactor at the temperature and pressure of the fluid entering the reactor.

The amount of oxygen in the fluid stream is sufficient to substantially oxidize contaminants in the fluid stream and, therefore, the amount of oxygen in the oxygen containing fluid stream should be present in an amount, with respect to said contaminants, of at least 2 times stoichiometric, preferably 2 to 10. Recognizing that air contains 21% oxygen and that contaminants may be contained in the air at ppm levels, there is no disadvantage to fluid streams containing oxygen at thousands of times the stoichiometric ratio. In addition, if the organic contaminants in an aqueous system are desired to be oxidized to the corresponding acid, lesser amounts of oxygen may be employed. The contaminants in the contaminated fluid stream are volatile organic compounds (VOCs) as for example benzene, chlorinated volatile organic compounds (CVOCs) as for example trichloroethylene, toxic air pollutants (TAPs) as for example acrylonitrile, and mixtures thereof. Generally, the contaminants are organic contaminants and include compounds of carbon and hydrogen. The ultraviolet light has a wavelength of less than or equal to 400 nm and, preferably, between about 185 to about 375 nm. The intensity of the ultraviolet light on the incident exterior surface of the photocatalyst is at least about 0.1 mw/cm$^2$ and preferably is between about 5 mw/cm$^2$ to 500 mw/cm$^2$.

Advantages of the present invention will be made clear from the following examples.

EXAMPLE 1

A tubular glass reactor having an outer diameter of 28.4 mm and thickness of 3 mm was constructed. A germicidal ultraviolet lamp having a power rating of 16 watts and an arc length of 273 mm was inserted into the reactor. The ultraviolet lamp was positioned inside the glass reactor using polypropylene bushings at each end. The reaction zone, i.e., the annular space between the ultraviolet lamp and the inner wall of the glass reactor, had a thickness of 5 mm and provided a maximum charge of 80 cm$^3$ of photocatalyst between the bulb and the reactor wall. The glass reactor had an inlet for the introduction of the air stream containing organic contaminant and an outlet for removal of the purified air stream.

An air stream at 19° C. containing 60 ppm of trichloroethylene (TCE) at 50% relative humidity was introduced into the reactor at about 1 atm pressure and passed through the reaction zone while being irradiated by the germicidal ultraviolet lamp at an intensity of about 20 mW/cm$^2$. Approximately 80 cm$^3$ of 8 to 12 mesh photocatalyst prepared by the process described above, containing 0.012% titania and 0.01% zirconia and the balance silica, was charged in the reaction zone of the glass reactor. At steady state, the reactor outlet was analyzed for the concentration of unreacted TCE.

At a contact time (Contact time is defined as the ratio of the volume of the photocatalyst to the total volumetric flow rate through the reactor) of only 0.35 seconds, the catalyst provided a destruction efficiency of 99% removal of TCE. No byproducts were observed in the effluent, as measured by gas chromatography and by compound specific detector tubes for phosgene, aldehydes, and carbon monoxide. Chlorine atoms of the TCE appeared predominately as HCl, with small amounts of Cl$_2$ produced. These inorganic chlorine products are readily removed by caustic scrubbers or similar systems known to those skilled in the art. This is a surprisingly high catalyst activity, since prior art photocatalysts have been reported above to required up to 34 seconds to 100 seconds contact time to achieve high destruction efficiency. No ozone or hydrogen peroxide had to be added to the feed in order to achieve high destruction efficiency, as would be expected to be required based on the prior art. Further, the prior art titania catalysts typically produce undesirable byproducts, as described by Perel and Ollis and in U.S. Pat. No. 4,966,665, both discussed earlier, which surprisingly were not produced by the catalyst of the present invention.

EXAMPLE 2

The catalyst of Example 1 was operated in the reactor system described in Example 1, except the inlet TCE concentration was maintained at 500 ppm. The system was operated continuously for about 250 hours, followed by an additional 250 hours at 200 ppm TCE. Surprisingly, no loss of catalyst activity was observed during this entire period, as evidenced by a decline in destruction efficiency or the appearance of byproducts in the reactor effluent. By contrast, prior art photocatalysts have been reported to undergo deactivation under these conditions in a few hours, as summarized in Raupp, G.B., supra.

EXAMPLE 3

The reactor system of Example 1 was used to compare the photocatalytic activity of the photocatalyst of the present invention with those of the other similar compositions. The inlet gas to the reactor was supplied at 30° C. and contained about 50 ppm of TCE and about 4 mg/liter of water vapor. The UV lamp was a germicidal lamp, with a peak UV intensity at 254 nm and of about 20 mW/cm$^2$ at the lamp surface. The catalysts employed in the following table exhibited a particle size range of 8 to 12 mesh. At steady state, the following measurements were made of the activity of three catalysts.

Two catalysts were prepared which are catalysts not claimed in the present invention, one containing low levels of titania with the balance being silica, and one containing low levels of zirconia with the balance silica. The photocatalyst of the present invention contains both zirconia and titania, at the compositions shown in the following table.

| Effect of Catalyst Composition on Photocatalytic Activity Germicidal Light, 254 nm | | | | | |
|---|---|---|---|---|---|
| Titania Content, wt % | Zirconia Content, Wt % | Catalyst Volume, Cc | Flow Rate, liter/min | Conversion % of inlet | First Order Rate Constant, min$^{-1}$ |
| 0 | 0.01 | 53 | 9.5 | 34.3 | 75 |
| 0.012 | 0 | 56 | 9.5 | 44.1 | 99 |
| 0.012 | 0.01 | 56 | 9.5 | 83.1 | 302 |

Surprisingly, very low concentrations of titania and zirconia are able to achieve dramatic increases in photocatalytic activity when used in combination, but not when used separately. Still more surprisingly, these low levels of titania and zirconia do not harm the UV transparency of the silica photocatalyst, and are thus efficiently usable in large scale operations such as described in Example 4.

EXAMPLE 4

A reactor was constructed with an internal volume of about 5 cubic feet, into which were placed 59 UV bulbs with a peak UV intensity at 365 nm, each of 40 watt capacity. The bulbs were arranged in 9 horizontal rows, in a triangular pitch layout. The 8 to 12 mesh catalyst of Example 1 was poured over these bulbs, in an amount of about 4.5 cubic feet. Air was passed in downflow, over the photocatalyst, at a rate of 50 SCFM while containing 22 ppm of TCE. When the bulbs were not illuminated, no conversion of TCE was observed. When six of the nine rows of bulbs were illuminated, the TCE destruction efficiency rapidly rose to 98+%. No byproducts were observed.

This is a surprisingly effective performance in a large-scale reactor system which is extremely cost-effective to build and simple to operate. A box reactor is built, containing commercial UV bulbs, and into which the particulate photocatalyst is poured. The ability to employ this simple and inexpensive reactor construction is believed to be due to the high UV transparency of the highly active photocatalyst. This reactor may be constructed in much larger scale by simply increasing the length or the number of UV light bulbs. By contrast, prior art photocatalyst systems commonly require a carefully applied thin film of photocatalyst over a substrate or on a concentric reactor wall around each bulb, which is costly for large scale manufacture, which provides ineffective destruction efficiency, which produces undesirable byproducts, and which deactivates rapidly over time. Surprisingly, the catalyst of the present invention suffers none of these defects.

EXAMPLE 5

Ultrapure water was saturated with oxygen by bubbling air through the water, to achieve about 7 ppm oxygen by weight in the water. Isopropanol was added to the water to achieve a concentration of 3.62 ppm by weight, and ethanol was also added to the water to achieve a concentration of 5.01 ppm by weight. Note that the total concentration of organics in the water substantially exceeded the amount of oxygen in the water, which will preclude total destruction of the organics in the water by photocatalysis.

A reactor system was employed which consisted of a water feed reservoir, containing the above components; a pump to circulate the water through a photocatalytic reactor; a photocatalytic reactor containing 10 ml of the catalyst of Example 1, in a bed depth of 5 mm, and with a quartz window to transmit UV light; a tubing to transmit the circulating water back into the water feed reservoir; and a low pressure germicidal UV bulb providing 12.8 mW/cm$^2$ of radiation at 254 nm, which impinged on the upper surface of the photocatalyst. The total volume of fluid in the system was 430 ml.

The pump was used to circulate the contaminated water through the photocatalytic reactor, and back to the feed reservoir, at a flow rate of 3.4 liter/min. The system was operated at a temperature of 70° F. The concentration of the organics in the water in the reservoir was measured with a chromatograph, and was found to decrease rapidly with time, as the batch of fluid was continuously circulated through the reactor and back to the reservoir. The photocatalyst was highly effective in reducing the concentration of isopropanol and ethanol in the aqueous solution. For this system, a reduced space time was calculated, represented by the following equation:

Reduced space time=(actual time of operation)×(volume of catalyst)/volume of system It was found that 48% of the combined initial concentration of isopropanol and ethanol was destroyed in a reduced space time of about 2 minutes, at which time the dissolved oxygen was substantially depleted. This is a highly active photocatalyst compared to those of the prior art, which typically require over 10 minutes to achieve substantial destruction of organics. Of course, the required space time for aqueous phase systems is substantially greater than for gas phase photocatalytic applications.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the photocatalytic oxidative destruction of contaminants from an oxygen containing fluid stream which comprises:

providing a photocatalyst comprising titanium in an amount of between about 0.001 wt % to about 2.0 wt %, zirconium in an amount of between about 0.001 wt % to about 2.0 wt %, and silica; and passing said oxygen containing fluid stream over said photocatalyst while irradiating the photocatalyst with ultraviolet light of wave length less than or equal to about 400 nanometers to destroy said contaminants, wherein the amount of oxygen in the oxygen containing fluid stream is sufficient to substantially oxidize said contaminants.

2. A process according to claim 1 wherein said silica comprises silica gel and said titanium and zirconium are supported by said silica gel.

3. A process according to claim 1 or 2 wherein said catalyst further comprises a metal selected from the group consisting of platinum, palladium and mixtures thereof in an amount of between about 0.01 wt % to about 2.0 wt %.

4. A process according to claim 1 or 2 wherein said catalyst further comprises a metal selected from the group consisting of silver, gold and mixtures thereof in an amount of between about 0.01 wt % to about 2.0 wt %.

5. A process according to claim 1 or 2 wherein said catalyst further comprises a metal selected from the group consisting of platinum, palladium and mixtures thereof in an amount of between about 0.01 wt % to about 2.0 wt %, and a metal selected from the group consisting of silver, gold and mixtures thereof in an amount of between about 0.01 wt % to about 2.0 wt %.

6. A process according to claim 1 or 2 including passing said oxygen containing fluid stream over said photocatalyst such that the contact time of the fluid stream with said photocatalyst is between about 0.01 seconds to 10 minutes, wherein the contact time is defined as the ratio of the volume of the photocatalyst to the total volumetric flow rate of said fluid stream.

7. A process according to claim 6 wherein said fluid is gas.

8. A process according to claim 7 including passing said oxygen containing gas stream over said photocatalyst such that the contact time of the gas stream with said photocatalyst is between about 0.05 seconds to 1 minute, where the contact time is defined as the ratio of the volume of the photocatalyst to the total volumetric flow rate of said gas stream.

9. A process according to claim 7 including passing said oxygen containing gas stream over said photocatalyst such that the contact time of the gas stream with said photocatalyst is between about 0.1 seconds to 5.0 minute, where the contact time is defined as the ratio of the volume of the photocatalyst to the total volumetric flow rate of said gas stream.

10. A process according to claim 6 wherein said fluid stream is an aqueous stream.

11. A process according to claim 10 including passing said oxygen containing aqueous stream over said photocatalyst such that the contact time of the aqueous stream with said photocatalyst is between about 0.5 seconds to 5 minutes, where the contact time is defined as the ratio of the volume of the photocatalyst to the total volumetric flow rate of said aqueous stream.

12. A process according to claim 1 wherein the amount of oxygen in the oxygen containing fluid stream is present in an amount, with respect to said contaminants, of at least 2 times stoichiometric.

13. A process according to claim 1 or 2 wherein said contaminants are selected from the group consisting of volatile organic compounds (VOCs), chlorinated volatile organic compounds (CVOs), toxic air pollutants (TAPs), and mixtures thereof.

14. A process according to claim 1 or 2 wherein said contaminants are organic contaminants and include compounds of carbon and hydrogen.

15. A process according to claim 1 or 2 wherein the process is carried out under the following conditions: a temperature of between about 50° F. to about 200° F.; pressure of between about 0.1 to about 10 atm.

16. A process according to claim 1 or 2 wherein the process is carried out under the following conditions: a temperature of between about 70° F. to about 150° F.; pressure of between about 0.8 to about 1.5 atm.

17. A process according to claim 1 or 2 wherein the process is carried out under the following conditions: a temperature of $\leq 1000°$ F.

18. A process according to claim 1 or 2 wherein the ultraviolet light has a wave length of between about 185 to about 375 nanometers.

19. A process according to claim 1 or 2 wherein the photocatalyst has relative UV light transmission of at least about 200 microwatts/cm$^2$.

20. A process according to claim 1 or 2 wherein the ultraviolet light has an incident intensity on the exterior surface of the photocatalyst of at least about 0.1 mw/cm$^2$.

21. A process according to claim 1 or 2 wherein the ultraviolet light has an incident intensity on the exterior surface of the photocatalyst of between about 5 mw/cm$^2$ to 500 mw/cm$^2$.

22. A process according to claim 1 or 2 wherein the photocatalyst has the follow physical properties:
   pore volume $\geq 0.4$ cm$^3$/g;
   surface area $\geq 100$ m$^2$/g; and
   a water saturation capacity of $\leq 7$ wt. % at 10% relative humidity air at 70° F.

23. A process according to claim 2 wherein the photocatalyst has the follow physical properties:
   pore volume preferred 0.4 to 1.5 cm$^3$/g;
   surface area preferred 100 to 400 m$^2$/g; and
   a water saturation capacity of $\leq 5$ preferred at 10% relative humidity air at 70° F.

24. A process according to claim 1 wherein the photocatalyst comprises titanium in an amount of between about 0.005 wt % to about 0.500 wt. % and zirconium in an amount of between about 0.005 wt. % to about 0.500 wt. %.

25. A process according to claim 1 wherein the photocatalyst comprises titanium in an amount of between about 0.008 wt % to about 0.080 wt. % and zirconium in an amount of between about 0.008 wt. % to about 0.080 wt. %.

* * * * *